(12) United States Patent
Hwang et al.

(10) Patent No.: US 8,092,952 B2
(45) Date of Patent: Jan. 10, 2012

(54) POLYMER BLEND ELECTROLYTE MEMBRANE FOR USE AT HIGH TEMPERATURE AND MANUFACTURING METHOD THEREOF

(75) Inventors: In Chul Hwang, Gyeonggi-do (KR); Nak Hyun Kwon, Seoul (KR); Ki Yun Cho, Seoul (KR); Young Taek Kim, Pocheon-gun (KR); Hee Woo Rhee, Seoul (KR); Li Jin Ghil, Gyeonggi-do (KR)

(73) Assignees: Hyundai Motor Company, Seoul (KR); Industry-University Cooperation Foundation Sogang University, Seoul (KR)

( * ) Notice: Subject to any disclaimer, the term of this patent is extended or adjusted under 35 U.S.C. 154(b) by 580 days.

(21) Appl. No.: 12/229,302

(22) Filed: Aug. 20, 2008

(65) Prior Publication Data
US 2009/0208848 A1    Aug. 20, 2009

(30) Foreign Application Priority Data
Feb. 20, 2008 (KR) .......................... 10-2008-0015339

(51) Int. Cl.
- *H01M 8/10* (2006.01)
- *B01J 49/00* (2006.01)
- *C08J 5/20* (2006.01)

(52) U.S. Cl. ........................... 429/491; 429/492; 521/27
(58) Field of Classification Search .................. 429/309, 429/479, 491, 492, 493, 494; 521/27
See application file for complete search history.

(56) References Cited

U.S. PATENT DOCUMENTS

| | | | |
|---|---|---|---|
| 7,214,756 B2 * | 5/2007 | Nomura et al. | ................. 528/30 |
| 2003/0219640 A1 | 11/2003 | Nam et al. | |
| 2006/0142504 A1 | 6/2006 | Ree et al. | |
| 2007/0087246 A1 * | 4/2007 | Shin et al. | ........................ 429/33 |

FOREIGN PATENT DOCUMENTS

| | | |
|---|---|---|
| JP | 2005-276721 | 10/2005 |
| JP | 2006-289985 | 10/2006 |
| JP | 2007-027091 | 2/2007 |

* cited by examiner

*Primary Examiner* — Jerry Lorengo
*Assistant Examiner* — Carlos Barcena
(74) *Attorney, Agent, or Firm* — Edwards Wildman Palmer LLP; Peter F. Corless (57) ABSTRACT

The present invention relates to a polymer blend electrolyte membrane comprising an inorganic polymer having polydimethylsiloxane as a main chain, which has a pore structure at both ends formed by condensation reaction between 3-aminopropyltriethoxysilane and tetraethylorthosilicate, wherein phosphoric acid is chemically linked to an amino group of the pore structure; and a proton-conducting polymer having a cation exchange group at the side chain thereof, as well as a manufacturing method thereof. Generally, proton-conducting electrolyte membranes have significantly reduced ion conductivity at high temperatures. However, proton-conducting electrolyte membranes have advantages in terms of efficiency and cost, and thus it is needed to develop an electrolyte membrane, which has excellent ion conductivity even at high temperature. Accordingly, the present invention aims to provide a polymer blend electrolyte membrane for use at high temperature and a manufacturing method thereof.

7 Claims, 3 Drawing Sheets

POLYMER BLEND ELECTROLYTE MEMBRANE FOR USE AT HIGH TEMPERATURE AND MANUFACTURING METHOD THEREOF

CROSS-REFERENCE TO RELATED APPLICATION

This application claims the benefit under 35 U.S.C. §119 (a) of Korean Patent Application No. 10-2008-0015339 filed on Feb. 20, 2008, the entire contents of which are incorporated herein by reference.

BACKGROUND OF THE INVENTION (a) Field of the Invention

The present invention relates to a polymer blend electrolyte membrane comprising an inorganic polymer having polydimethylsiloxane as a main chain, which has a pore structure at both ends formed by a condensation reaction between 3-aminopropyltriethoxysilane and tetraethylorthosilicate, wherein phosphoric acid is chemically linked to an amino group of the pore structure; and a proton-conducting polymer having a cation exchange group at the side chain thereof, as well as a manufacturing method thereof. Generally, proton-conducting electrolyte membranes have significantly reduced ion conductivity at high temperatures. However, proton-conducting electrolyte membranes have advantages in terms of efficiency and cost, and thus there remains a need to develop an electrolyte membrane which has excellent ion conductivity, even at high temperatures. Accordingly, the present invention aims to provide a polymer blend electrolyte membrane for use at high temperature and a manufacturing method thereof.

(b) Background Art

A fuel cell is an electrochemical device that converts the chemical energy of hydrogen and oxygen directly into electrical energy, and is a new electricity generation technology that continuously produces electricity by supplying hydrogen and oxygen to anode and cathode electrodes.

With respect to the general properties of fuel cells, heat is also generated in a process of producing electricity by the electrochemical reaction of fuel, making it possible to achieve high-efficiency electricity generation at a total efficiency of more than 80%, and the fuel cell has an efficiency higher than that of existing thermal power generation, making it possible to save fuel for electricity generation and to perform co-generation. In addition, the fuel cell is a pollution-free energy technology, in which the emissions of nitrogen oxides and $CO_2$ are about ⅓s and ⅓, respectively, compared to those of coal burning thermal power generation. The level of noise pollution is also very low, so that pollutants are not substantially discharged.

In addition, because fuel cell modules can be manufactured, construction of the fuel cell plant can be shortened, an increase or decrease in the equipment capacity of the fuel cell plant is possible, and the site selection of the fuel cell plant is easy. Thus, because the fuel cell can be placed in urban areas or buildings, it can economically supply energy. Also, because the fuel cell can employ various fuels, including, but not only limited to, natural gas, city gas, naphtha, methanol and waste gases, it can substitute for existing thermal power generation and can be applied in power plants for distributed generation, co-generation power plants, power sources for pollution-free automobiles, and the like.

Recently, due to environmental problems and the exhaustion of energy sources, and in order to use fuel cell automobiles in practice, there has been a need for high-performance fuel cells having high energy efficiency and that can be operated at high temperatures and, at the same time, that are reliable. In addition, in order to increase the efficiency of such fuel cells, the development of polymer membranes, which can be used at high temperatures, has also been required. Fuel cells are largely classified into molten carbonate fuel cells (MCFCs) operating at high temperatures (500-700° C.), phosphoric acid fuel cells (PAFCs) operating at about 200° C., alkaline fuel cells (AFCs) operating in the range from room temperature to about 100° C., and polymer electrolyte fuel cells.

Among these fuel cells, the polymer electrolyte fuel cells are an example of a future clean energy source capable of substituting for fossil energy and have high output density and energy conversion efficiency. Also, the polymer electrolyte fuel cells can be operated at room temperature and can be miniaturized and closed, and thus they can be used in a wide range of applications, including pollution-free automobiles, residential power generation systems, mobile communication systems, medical devices, military equipment, and equipment for space applications.

Such polymer electrolyte fuel cells can largely be classified into proton exchange membrane fuel cell (PEMFCs), which use hydrogen gas as a fuel, and direct methanol fuel cells (DMFCs), which use liquid methanol, supplied directly to the anode, as a fuel.

Figure 1:
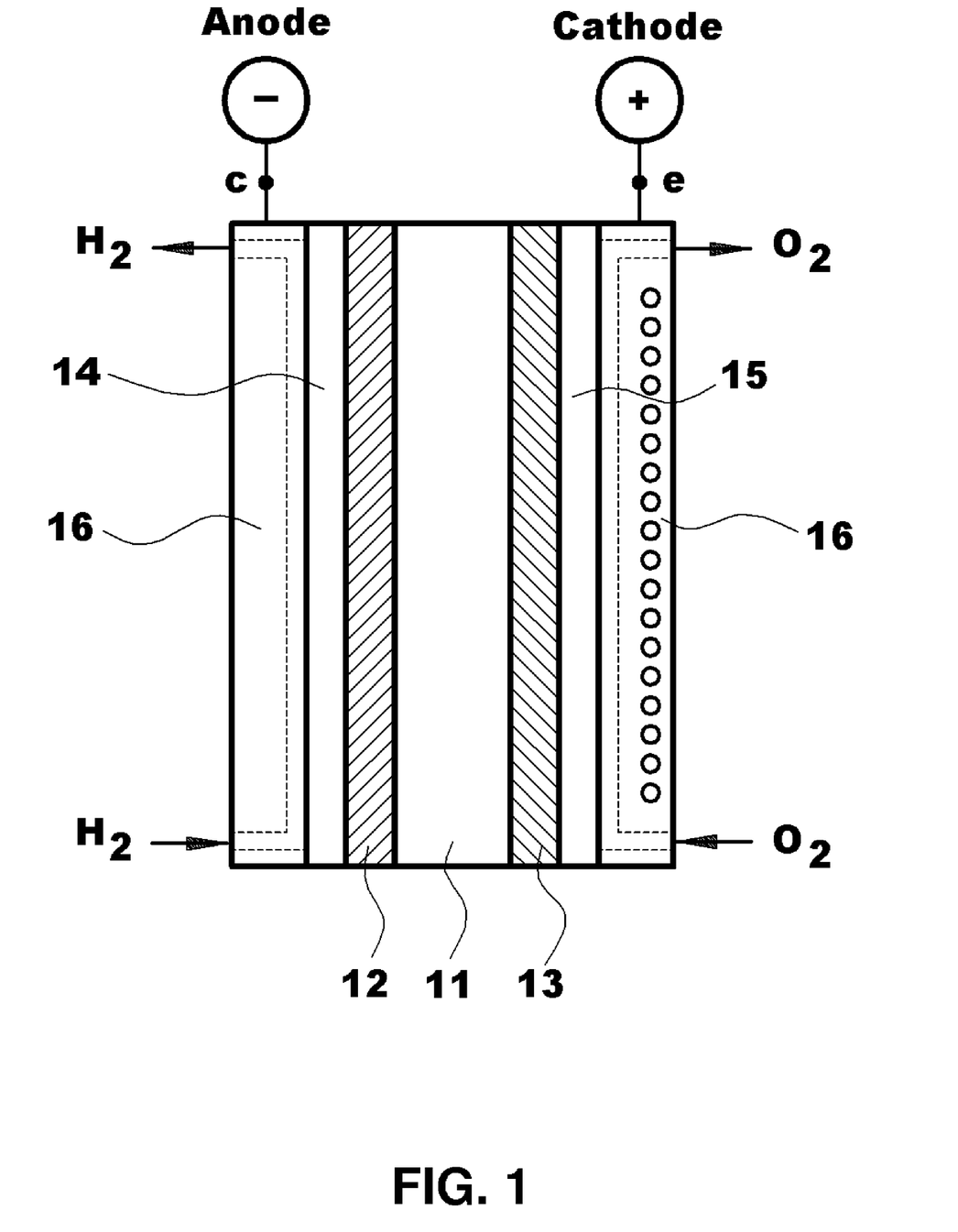
FIG. 1 shows the general structure of a polymer electrolyte fuel cell.

The proton exchange membrane fuel cell (PEMFC) is a power production system that produces direct current electricity from an electrochemical reaction of hydrogen with oxygen, and the general structure of PEMFC is shown in exemplary FIG. 1. The PEMFC has a structure in which a proton-conducting polymer membrane is interposed between an anode and a cathode. Specifically, PEMFC may comprise: a proton-conducting polymer membrane, which has a thickness of 50-200 μm and made of a solid polymer electrolyte; an anode and a cathode (hereinafter, the cathode and anode will be commonly referred to as "gas diffusion electrodes"), which suitably comprise the respective support layers for the supply of reaction gas, and the respective catalyst layers in which oxidation/reduction reactions occur; and a carbon plate, which has grooves for gas injection and functions as a current collector. The catalyst layers in the gas diffusion electrodes of PEMFC are suitably formed on the support layers, respectively, in which the support layers are made of carbon cloth or carbon paper, and the surfaces thereof are treated such that reaction gas, water, which is transferred to the proton-conducting polymer membrane, and water resulting from the reactions, are easily passed.

In PEMFC having the above-described structure, the reaction gas hydrogen is supplied, while an oxidation reaction occurs in the anode to convert hydrogen molecules to hydrogen ions and electrons, and the converted hydrogen ions are transferred to the cathode through the proton-conducting polymer membrane. In the cathode, a reduction reaction, in which oxygen molecules become oxygen ions by receiving electrons, occurs, and the produced oxygen ions are converted to water molecules by reacting with the hydrogen ions that are transferred from the anode.

The proton-conducting polymer membrane functions to transfer protons, generated in the anode, to the cathode. In order to obtain a high output (i.e., high current density) in PEMFC, the conduction of protons needs to be performed in a sufficient amount at a high rate. Accordingly, the performance of the proton-conducting polymer membrane is important in determining the performance of PEMFC. In addition to its function to conduct protons, the proton-conducting polymer membrane functions as an insulating film to electrically insulate the anode and the cathode, and also functions as a fuel barrier film for preventing a fuel, supplied to the anode, from leaking to the cathode.

One example of a main proton conducting membrane, which is used in PEFC at present, is a fluororesin-based membrane having a perfluoroalkylene as a main skeleton and partly having a sulfonic acid group at the end of perfluorovinylether side chain. Known examples of such sulfonated fluororesin-based membranes include, but are not limited to, Nafion (trade name) (produced by E.I. Dupont de Nemours), Flemion (trade name) film (produced by Asahi Glass KK), Aciplex (trade name) film (produced by Asahi Chemical Industry Co.), etc. These fluororesin-based membranes have chemical structures, shown in the following formula I and Table 1.

TABLE 1

Fluororesin-based membranes (structural parameters for formula I) produced by various manufacturers)

[Formula I]

$$-(CF_2-CF_2)_x-(CF_2-CF)_y-$$
$$(O-CF_2-CF)_m-O-(CF_2)_n-SO_3H$$
$$\phantom{(O-CF_2-}CF_3$$

| Structural parameters | Manufacturer | Trade name | Equivalent weight | Thickness (□) |
|---|---|---|---|---|
| m = 1; | Dupont | Nafion 120 | 1200 | 260 |
| x = 5-13.5; | | Nafion 117 | 1100 | 175 |
| n = 2; | | Nafion 115 | 1100 | 125 |
| y = 1 | | Nafion 112 | 1100 | 80 |
| M = 0.1, | Asahi | Flemion-T | 1000 | 120 |
| n = 1.5 | Glass | Flemion-S | 1000 | 80 |
| | | Flemion-R | 1000 | 50 |
| M = 0; | Asahi | Aciplex-S | 1000- | 25- |
| n = 2-5; | Chemical | | 1200 | 100 |
| x = 1.5-14 | | | | |

These exemplary fluororesin-based membranes are considered to have a glass transition temperature (Tg) in the vicinity of 130° C. under suitably wet conditions where the fuel cell is used. In the vicinity of this temperature, so-called creep occurs.

As a result, the protonic conduction structure in the membrane changes, making it impossible to attain stable protonic conduction performance. Furthermore, the membrane is denatured to a swollen state which, after prolonged exposure to high temperature, becomes jelly-like and thus can easily break, leading to failure of the fuel cell.

For the aforementioned reasons, the current highest temperature at which the fuel cell can be used stably over an extended period of time is normally 80° C.

A fuel cell employs chemical reaction in principle, and thus exhibits a higher energy efficiency when operated at higher temperatures. Accordingly, when considered on the basis of the same electricity output, a device which can be operated at higher temperatures can be suitably reduced more in size and weight. Furthermore, when the fuel cell is operated at high temperatures, its exhaust heat can be utilized as well, allowing cogeneration (combined supply of heat and electricity) that enhances the total energy efficiency.

Accordingly, it is considered that the operating temperature of a fuel cell is somewhat higher, normally 100° C., particularly preferably 120° C. or more (see, for example, Korean Patent Registration No. 10-0701549).

When the polymer electrolyte fuel cell is operated at temperatures higher than 100° C., the activity of the electrode catalyst and the reaction rate of the electrode can suitably increase, and thus the fuel cell performance can be improved with a reduced amount of the catalyst.

Further, a decrease in the amount of use of an expensive platinum catalyst can lead to a suitable decrease in the cost of the fuel cell system. Furthermore, a few ppm of hydrocarbon contained in reformed hydrogen fuel is oxidized to carbon monoxide by a catalytic reaction on the electrode surface, and the generated carbon monoxide is adsorbed on the surface of the platinum catalyst to poison the catalyst. The adsorption of carbon monoxide onto the catalyst is an exothermic reaction, and thus when the fuel cell is operated at suitably high temperatures, the performance of the fuel cell can be stably improved, because catalyst poisoning can be suitably reduced, even when reformed hydrogen gas containing a small amount of hydrocarbon is used. Preferably, when the fuel cell can be operated with external pressurization, an external pressurizing device and humidifying device becomes simple or unnecessary, thus providing advantages in terms of the optimization of the entire system and costs.

In the case of direct fuel cells (e.g., DMFC) which directly use fuels other than hydrogen, studies focused on efficiently extracting protons and electrons from fuels have been conducted. However, the improvement in the fuel barrier property of the proton-conducting polymer membrane, and operation at a high temperature at which a catalyst effectively functions, are considered to be important factors necessary to obtain a sufficient output.

Accordingly, although it may be considered desirable that PEFC is operated at higher temperatures, the heat resistance of the proton conducting membrane is up to 80□ as previously mentioned and the operating temperature of the fuel cell, too, is thus limited to 80□ at present.

The reaction occurring during the operation of a fuel cell is an exothermic reaction, and when a fuel cell is operated, the temperature in PEFC rises spontaneously. However, since Nafion, which is a representative proton conducting membrane that is used at present, has only heat resistance up to about 80□, it is necessary that PEFC be cooled so that the temperature does not reach 80□. Cooling is normally carried out by a water cooling method, and the separator portion of PEFC is devised for such cooling. When such a cooling unit is employed, the entire system of PEFC has an increased size and weight, making it impossible to make sufficient use of the original characteristics of PEFC, which are small size and light weight.

In particular, when the limit of operation temperature is 80° C., a water cooling system, which is the simplest cooling system, can make effective cooling difficult. If operation at 100□ or more is made possible, effective cooling can be made by releasing the evaporation heat of water, and when water is circulated, the amount of water to be used in cooling can be drastically reduced, thus making it possible to attain the reduction of size and weight of the device.

In particular, in cases where PEFC is used as an energy source for vehicles, the comparison of the system involving the temperature control to 80° C. with the system involving the temperature control to 100° C. or more shows that the volume of radiator and cooling water can be drastically reduced, and it has thus been desired to provide PEFC which can operate at 100° C. or more, i.e., a proton conducting membrane having a heat resistance of 100° C. or more.

As mentioned herein, although PEFC has been required to operate at high temperatures, that is, proton conducting membranes are required to have high temperature resistance for electricity generating efficiency, cogeneration efficiency, cost, resources and cooling efficiency, no proton conducting membranes having both sufficient protonic conductivity and heat resistance exist. For this reason, various polymer materials and organic/inorganic composite materials, which have excellent electrochemical properties and thermal properties and, at the same time, can overcome the above-described problems, have been proposed for use.

A representative example of these heat-resistant proton conducting materials is a heat-resistant aromatic polymer material, Examples of such a heat-resistant aromatic polymer material include polybenzimidazoles, polyethersulfones and polyether ether ketones, etc. However, these aromatic polymers have a problem in that they are difficult to manufacture in the form of a membrane because they are very hard, and thus are difficult to dissolve.

Furthermore, these aromatic polymer materials exhibit deteriorated heat resistance or hot water resistance similar to the fluororesin-based membranes and can be dissolved in hot water in some cases. Moreover, when water is present, the entire membrane tends to swell similar to the fluororesin-based membrane, and due to the change of the size of the membrane, stress is applied to the junction of the membrane-electrode assembly, making it very likely that the membrane and the electrode can be exfoliated at the junction, or that the membrane can be broken, and thus there may be a reduction of strength of the membrane due to swelling that can cause membrane destruction. Furthermore, since these aromatic polymer materials are polymer compounds which stay rigid when dried, the membrane may undergo destruction during the formation of the membrane-electrode assembly.

In order to solve these problems, methods for introducing these electrolytes into a porous resin have been studied (see U.S. Pat. No. 6,242,135). In this case, the film strength and dimensional stability can be improved, but the proton conducting membrane used remains the same and heat stability is not improved. (Korean Patent Registration No. 10-0701549).

Moreover, studies on composites with inorganic materials (e.g., silica), which having high water absorption capability, have been conducted, but the inorganic materials are not conductive or the conductivity is lower than that of organic materials.

Published literature relating to proton-conducting polymers, which use such inorganic materials to improve the physical and chemical properties thereof, have been described as follows. U.S. Pat. No. 5,283,310 discloses a polymer, which contains —O—Si(WX)—O—Si(YZ)—$R_1$— as a fundamental structure and forms an inorganic-inorganic copolymer network. US Patent Publication No. 2004-146766 discloses an organic-inorganic conductive polymer, which has a silane group as a skeleton and contains a nitro group, which is linked to silicon by an alkyl group. Korean Patent Laid-Open Publication No. 2005-19667 discloses a network-type polymer, in which ethylene oxide is linked to the side chain of a siloxane polymer, such that the siloxane polymer can stably form a network, thus improving the mechanical properties, chemical stability and ion conductivity of the polymer. In addition, Korean Patent Laid-Open Publication No. 1999-82205 discloses a macropolymer, which is formed of a polymer having a silicon-oxygen main chain and thus has high electrical conductivity at room temperature.

Although phosphoric acid shows excellent proton-conducting properties at high temperature and room temperature, it is advantageous in that phosphoric acid is leached with water, when it is humidified. For this reason, the operating temperature of a phosphoric acid fuel cell is limited to temperatures higher than the boiling point of water and, in addition, time and power are consumed to increase the operating temperature. The present inventors have found that, when phosphoric acid is chemically linked to an inorganic polymer, which has more desirable electrochemical properties and thermal and mechanical stabilities, a proton-conducting polymer membrane can be manufactured.

The information disclosed in this Background of the Invention section is only for enhancement of understanding of the background of the invention and should not be taken as an acknowledgment or any form of suggestion that this information forms the prior art that is already known to a person skilled in that art.

SUMMARY OF THE INVENTION

In one aspect, the present invention is directed to the synthesis of a polymer electrolyte membrane which comprises phosphoric acid, having ion conductivity at room temperature and high temperature, linked to a matrix, and thus has excellent electrochemical properties, mechanical properties and thermal stability and can be used at high temperatures. In one embodiment, the present invention provides a polymer blend electrolyte membrane, which is manufactured by blending the polymer electrolyte with a proton-conducting polymer, having excellent thermal and mechanical properties and excellent ion conductivity, and thus can exhibit reduced interfacial resistance when assembled with electrodes, and can achieve excellent fuel cell performance.

In another embodiment, the present invention is directed to a polymer blend electrolyte membrane for use at high temperature, and a manufacturing method thereof. In further embodiments, the present invention is direct to a polymer blend electrolyte membrane comprising an inorganic polymer having polydimethylsiloxane as a main chain, which preferably has a pore structure at both ends formed by condensation reaction between 3-aminopropyltriethoxysilane and tetraethylorthosilicate, wherein phosphoric acid is chemically linked to an amino group of the pore structure; and a proton-conducting polymer having a cation exchange group at the side chain thereof.

In another embodiment, the present invention is directed to a method for manufacturing a proton-conducting polymer blend electrolyte membrane, the method comprising the steps of: blending a polymer comprising, consisting essentially of, or consisting of an inorganic polymer, which has polydimethylsiloxane as a main chain and preferably comprises pore structures of structures 3-aminopropyltriethoxysilane and tetraethylorthosilicate at one or both ends thereof, with a proton-conducting polymer having a cation exchange group at the side chain thereof; and adding phosphoroxychloride to the polymer blend to link phosphoric acid to the amino group of the polymer blend so as to impart ionic conductivity to the polymer blend.

The proton-conducting polymer blend electrolyte membrane according to the present invention in preferred aspects can inhibit excellent hydrogen ion conductivity and thermal and mechanical stabilities.

The polymer blend electrolyte membrane of the present invention in preferred aspects can exhibit excellent hydrogen ion conductivity even at high temperature, and thus, when a fuel cell comprising a preferred membrane is operated at a suitably high temperature, the activity of a catalyst in the electrode layer of the fuel cell is increased. Also, in particular embodiments, even when a reduced amount of a catalyst is used in the fuel cell, the same fuel cell efficiency is suitably maintained, thus providing an advantage in terms of catalyst cost. In particular embodiments, resistance to catalyst poisoning can also be suitably increased to improve the long-term stability of the fuel cell.

In addition, because the inventive method for manufacturing the polymer blend electrolyte membrane preferably employs the inorganic polymer, the cost of the material is suitably low. Moreover, because the manufacturing process is simple, the inventive method has an excellent mass production capability and can suitably improve the economy of the process.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Reference numerals set forth in the Drawings includes reference to the following elements as further discussed below:

11: polymer electrolyte membrane
12: anode catalyst layer 13: cathode catalyst layer
14: anode support layer 15: cathode support layer
15: carbon plate.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a polymer blend electrolyte membrane comprising an inorganic polymer having polydimethylsiloxane as a main chain; and a proton-conducting polymer having a cation exchange group at the side chain thereof. In certain embodiments, the inorganic polymer having polydimethylsiloxane as a main chain has a pore structure at both ends formed by condensation reaction between 3-aminopropyltriethoxysilane and tetraethylorthosilicate, and wherein phosphoric acid is chemically linked to an amino group of the pore structure.

The invention also features in other aspects a method for manufacturing a proton-conducting polymer blend electrolyte membrane, the method comprising the steps of blending a polymer comprising, consisting essentially of, or consisting of an inorganic polymer, which has polydimethylsiloxane as a main chain, with a proton-conducting polymer having a cation exchange group at the side chain thereof. In certain embodiments, the method further comprises the step of adding phosphoroxychloride to the polymer blend preferably to link phosphoric acid to the amino group of the polymer blend so as to impart ionic conductivity to the polymer blend. In other embodiments, the polymer component comprises, consists essentially of or consists of an inorganic polymer, which has polydimethylsiloxane as a main chain, and preferably comprises pore structures of 3-aminopropyltriethoxysilane and tetraethylorthosilicate at least one end thereof, preferably at both ends thereof.

The invention also features a fuel cell comprising a motor vehicle comprising a polymer blend electrolyte membrane as described herein.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Recently, due to environmental problems and the exhaustion of energy sources, and in order to use fuel cell vehicles in practice, there has been a need to develop high-performance fuel cells which have high energy efficiency, can be operated at high temperatures and, at the same time, are reliable. However, the prior commercial electrolyte membrane of PEMFC has a cation conductivity that is rapidly decreased at high temperatures, and thus the operating temperature of PEMFC is limited to 80° C. Accordingly, the development of a polymer membrane, which can be used at suitably high temperatures, is desired in order to increase the efficiency of the fuel cell.

The present invention is directed to a polymer blend electrolyte membrane for use at high temperature and a manufacturing method thereof.

In certain embodiments, the present invention describes a polymer blend electrolyte membrane preferably comprising an inorganic polymer having polydimethylsiloxane as a main chain, which has a pore structure at both ends formed by condensation reaction between 3-aminopropyltriethoxysilane and tetraethylorthosilicate, wherein phosphoric acid is chemically linked to an amino group of the pore structure; and a proton-conducting polymer, which has a suitable cation exchange group at the side chain thereof.

As referred to herein, inorganic polymers are polymer materials in which elements other than carbon are suitably linked together into repeat units by any chemical linkage. Accordingly, most inorganic solids and ionic crystals of inorganic salts are preferably also included. In addition, as referred to herein, inorganic polymers may comprise an organic component, e.g. those polymers having an organic group (e.g. $C_{1-12}$ ester, $C_{1-12}$ allyl, phenyl or carbocyclic aryl, etc) suitably linked e.g. as a side chain of the polymers are also included within the term "inorganic polymer" as used herein. In certain embodiments, an inorganic polymer may contain less than 50, 40, 30, 20, 10, 5, 2, or 1 weight percent carbon. In other certain embodiments, the inorganic polymer refers to a suitable polymer material, which forms, for example, a plastic material, a rubbery material or a highly stable liquid and has a main chain comprising, consisting essentially of or consisting of elements other than carbon.

In preferred embodiments, the inorganic polymer in the present invention suitably includes phosphoric acid chemically linked thereto, has polydimethylsiloxane as a main chain and comprises pore structures of 3-aminopropyltriethoxysilane and tetraethylorthosilicate at least one end thereof, preferably at both ends thereof.

3-aminopropyltriethoxysilane consists of three ethoxy groups and one aminopropyl group, in which one of the three ethoxy groups reacts with the ethoxy group of tetraethylorthosilicate, and the remaining two ethoxy groups are condensed with ethoxy groups adjacent thereto, thus forming suitable pore structures. In preferred embodiments, an OH group on the outside of the pores reacts with the —OH group of polydimethylsilane to form a suitable network structure.

In certain embodiments of the invention, owing to the Si—O—Si bond of polydimethylsilane, a polymer membrane is suitably obtained which has excellent thermal, chemical and electrochemical stabilities and high mechanical strength and is flexible. In one exemplary embodiment, in the polydimethylsilane substituted with 3-aminopropyltriethoxysilane at both ends, phase separation is suitably induced due to the main chain, which is hydrophobic, and both ends, which are hydrophilic, and a condensation reaction is suitably induced from the ethoxy groups at both ends. The amino group in the pores is preferably substituted with phosphoric acid by a reaction with phosphoroxychloride to form a suitable proton-conducting channel, and the conducting channel formed of phosphoric acid forms a suitable proton-conducting channel regardless of the presence of water due to the proton dissociation property of phosphoric acid itself.

According to one embodiment of the invention as described herein, the following structural formula 1 shows an example of a proton-conducting polymer, suitably prepared in the present invention using (1) polydimethylsilane, (2) 3-aminopropyltriethoxysilane and (3) phosphoric acid.

lane, and the remaining two ethoxy groups are suitably condensed with the adjacent ethoxy groups to form pore structures. Due to the Si—O—Si bond of the polydimethylsilane (1) as a main chain, a polymer membrane, which has thermal, chemical and electrochemical stabilities and is flexible, is suitably obtained. The 3-aminopropyltriethoxysilane (2) in the present invention functions to form a network structure through a condensation reaction and is substituted with the ion exchange group (3). In certain embodiments, for example in the case where phosphoric acid is preferably used as a hydrogen ion exchange group, when the distance between phosphoric acids is too long, protonic transfer can be limited, but the aminopropyl group contains three linear carbons therein, and thus suitably increases the mobility of the terminal groups to facilitate the movement of protons between phosphoric acids.

In certain embodiments, the present invention preferably provides a membrane obtained by suitably blending a polymer electrolyte, comprising cation exchange group phosphoric acid chemically linked to an inorganic polymer, with a proton-conducting polymer having a cation exchange group at the side chain thereof.

Accordingly, in preferred embodiments, a material, produced by mechanically mixing two or more polymers with each other, is called a "polymer blend". Preferably, many polymer blends show properties different from those of the respective polymers and exhibit the effects thereof by offsetting advantages and disadvantages of the respective polymers. Polymer blends, suitably obtained by mixing two or more polymers with each other, are preferably divided into two main types, a miscible blend and an immiscible blend. According to further embodiments of the invention, they are additionally divided into three categories: (1) polymers consisting of a simple foam mixture, (2) polymers, which have interpenetrating chains and are randomly mixed in view of the molecular level, and (3) block or graft polymers formed by physically breaking bonds and bound between other polymer segments.

[Structural Formula 1]

As shown in the structural formula 1, 3-aminopropyltriethoxysilane suitably consists of three ethoxy groups and one aminopropyl group, in which one of the three ethoxy groups preferably reacts with the —OH group of polydimethylsi- According to preferred embodiments, the inventive polymer blend electrolyte membrane obtained by suitably blending the conducting channel, formed of phosphoric acid, with the proton-conducting polymer having a suitable cation exchange group, has excellent proton conducting properties even at high temperature and has excellent thermal stability and mechanical properties. In further embodiments, when the membrane is preferably assembled with electrodes, it shows suitably reduced interfacial resistance and achieves excellent fuel cell performance.

In certain embodiments of the invention, the proton-conducting polymer that is used in the present invention may have a sulfonic acid group, a carboxylic acid group, a phosphoric acid group, a phosphonic acid group, or derivatives thereof, at the side chain thereof, and commercially available proton-conducting polymers include, but are not limited to, fluorine-based polymers, represented by the following formula I, such as the trade name Nafion (produced by E. I. Dupont de Nemours), the trade name Flemion (produced by Asahi Glass KK) and the trade name Aciplex (produced by Asahi Chemical Industry Co), as well as sulfonated poly (ether ether ketone) (s-PEEK)) and polybenzimidazole (PBI)):

[Formula I]

where m=1, x=5-13.5, n=2, y=1, and equivalent weight=1100-1200; or m=0, 1, n=1-5, and equivalent weight=1000; or m=0, n=2-5, x=1.5-14, and equivalent weight=1000-1200.

According to preferred embodiments, the polymer blend is preferably a polymer blend electrolyte membrane, which comprises, based on 100 parts by weight of the polymer blend electrolyte membrane, 30-80 parts by weight of the polymer consisting of phosphoric acid linked to the inorganic polymer. If the content of the phosphoric acid-linked polymer is less than 30 parts by weight, phosphoric acid-linked conducting channels potentially may be reduced, so that the ionic conductivity of the polymer membrane at high temperature will be reduced, and if the content is more than 80 parts by weight, the mechanical strength of the polymer membrane may be reduced.

According to further embodiments, the inventive electrolyte membrane prepared using the polymer blend has excellent ion conductivity even at high temperature and shows reduced interfacial resistance, when it is suitably assembled with electrodes.

In another embodiments, the present invention provides a membrane-electrode assembly for fuel cells, which comprises the polymer blend electrolyte membrane, and a fuel cell suitably comprising the membrane-electrode assembly. The polymer blend electrolyte membrane has excellent hydrogen ion conductivity even at suitably high temperature, and a fuel cell comprising the polymer blend electrolyte membrane can be operated even at high temperatures. Preferably, when the fuel cell is operated at high temperatures, the activity of a catalyst in the electrode layer of the fuel cell is suitably increased, leading to an increase in the fuel cell efficiency. Also, even when a reduced amount of a catalyst is preferably used in the fuel cell, the same fuel cell efficiency is suitably maintained, thus providing an advantage in terms of the catalyst cost. In particular embodiments, resistance to catalyst poisoning can be suitably increased to improve the long-term stability of the fuel cell.

In another aspect, the present invention provides a method for manufacturing a proton-conducting polymer blend electrolyte membrane, the method comprising the steps of: blending a polymer consisting of an inorganic polymer, which has polydimethylsiloxane as a main chain and comprises pore structures of 3-aminopropyltriethoxysilane and tetraethylorthosilicate at both ends thereof, with a proton-conducting polymer having a cation exchange group at the side chain thereof; and adding phosphoroxychloride to the polymer blend to link phosphoric acid to the amino group of the polymer blend so as to impart ionic conductivity to the polymer blend.

In preferred embodiments of the method as described herein, First, the inorganic polymer polydimethylsilane and the proton-conducting polymer having a cation exchange group at the side chain thereof are suitably dissolved in an organic solvent to prepare a proton-conducting polymer solution containing 5-10 wt % of the inorganic polymer dispersed therein.

In preferred embodiments, the inorganic polymer, polydimethylsilane treated with an —OH group at both ends thereof, which has a suitable molecular weight, can be used. Preferably, polydimethylsilane having a molecular weight of 550 can be selected and used in the present invention. If the molecular weight is excessively low, the mechanical strength of the resulting polymer membrane will be suitably reduced, and if the molecular weight is excessively high, the ionic conductivity of the resulting polymer membrane will be suitably reduced.

In certain embodiments of the invention, the proton-conducting polymer that is used in the present invention may have a sulfonic acid group, a carboxylic acid group, a phosphoric acid group, a phosphonic acid group, or derivatives thereof, at the side chain thereof, and commercially available proton-conducting polymers that include, but are not limited to, fluorine-based polymers, represented by the following formula I, such as the trade name Nafion (produced by E. I. Dupont de Nemours), the trade name Flemion (produced by Asahi Glass KK) and the trade name Aciplex (produced by Asahi Chemical Industry Co.), as well as sulfonated-poly (ether ether ketone) (s-PEEK)) and polybenzimidazole (PBI)):

[Formula I]

where m=1, x=5-13.5, n=2, y=1, and equivalent weight=1100-1200; or m=0 or 1, n=1-5, and equivalent weight=1000; or m=0, n=2-5, x=1.5-14, and equivalent weight=1000-1200.

In preferred embodiments, the organic solvent that is used in the present invention may be one or a mixture of two or more selected from the group consisting of, but not limited to, N-methyl-2-pyrrolidinone (NMP), dimethylformamide (DMF), dimethyl acetamide (DMA), tetrahydrofuran (THF), dimethyl sulfoxide (DMSO), acetone, methyl ethyl ketone (MEK), tetramethylurea, trimethyl phosphate, butyrolactone, isophorone, carbitol acetate, methyl isobutyl ketone, N-butyl acetate, cyclohexanone, diacetone alcohol, diisobutyl ketone, ethyl acetoacetate, glycol ether, propylene carbonate, ethylene carbonate, dimethylcarbonate and diethylcarbonate.

In further embodiments, the concentration of the inorganic polymer in the proton-conducting polymer solution prepared using the organic solvent is preferably adjusted to the range of 5-10 wt %. If the concentration is less than 5 wt %, the physical properties of the resulting membrane can be deteriorated, and the concentration is more than 10 wt %, the viscosity of the solution can be increased, leading to a decrease in the processability of the solution.

In further embodiments of the invention as described herein, tetraethylorthosilicate is added to 3-aminopropyltriethoxysilane to form suitable pore structures. In related embodiments, the molar ratio between the materials is adjusted such that the pore size is preferably 2-3 nm. If the pore size is more than 3 nm, the ion conductivity of the resulting polymer membrane may be reduced, and if the pore size is less than 2 nm, the ion conductivity at high temperatures may be reduced.

In other embodiments of the invention as described herein, the proton-conducting polymer solution having the inorganic polymer dispersed therein is preferably mixed with the solution having the pore structures, and a polymer membrane is suitably manufactured from the mixture. In certain embodiments, the proton-conducting polymer solution having the inorganic polymer dispersed therein is suitably mixed with the solution having the pore structures, and the mixture solution is cast and dried in an oven at 100° C. to manufacture a membrane having the desired thickness. Preferably, the thickness of the polymer membrane is in the range of 30-125 μm. If the thickness exceeds 125 μM, a decrease in proton conductivity may result, which in turn can increase the cost of the resulting polymer membrane, and if the thickness is less than 30 μm, the mechanical properties of the resulting polymer membrane can be compromised.

In further embodiments of the invention as described herein, phosphoroxychloride is added to the matrix, so that it is suitably liked to the amino group of the matrix to preferably impart ion conductivity. The phosphoric acid, which is used to maintain ion conductivity at room temperature and temperatures higher than 100° C., is not easy to link directly to the amino group, and thus phosphoroxychloride ($POCl_3$) is preferably used. In certain embodiments, for use only at room temperature, the use of sulfoxychloride is also possible.

The present invention is characterized in that the matrix polymer is suitably blended with the proton-conducting polymer, while it preferably maintains a network structure. In certain embodiments, 3-aminopropyltriethoxysilane consists of three ethoxy groups and one aminopropyl group, in which one of the three ethoxy groups reacts with the ethoxy group of tetraethylorthosilicate, and the remaining two ethoxy groups are suitably condensed with adjacent ethoxy groups to form pore structures. An OH group on the outside of the pores preferably reacts with the —OH group of polydimethylsilane to form a network structure.

In preferred embodiments of the invention, owing to the Si—O—Si bond of polydimethylsilane, a polymer membrane is suitably obtained which has thermal, chemical and electrochemical stabilities and high mechanical strength and is flexible. In certain embodiments, in the polydimethylsilane preferably substituted with 3-aminopropyltriethoxysilane at both ends, phase separation is suitably induced due to the main chain, which is hydrophobic, and both ends, which are hydrophilic, and a condensation reaction is suitably induced from the ethoxy groups at both ends. The amino group in the pores reacts with phosphoroxychloride, such that it is preferably substituted with phosphoric acid to suitably form proton-conducting channels. Thus, according to further embodiments, the conducting channel suitably formed of phosphoric acid forms a proton-conducting channel regardless of the presence of water due to the proton dissociation property of phosphoric acid itself. The polymer having the conducting channels formed of phosphoric acid is suitably blended with the proton-conducting polymer preferably having a cation exchange group at the side chain thereof, and the polymer blend membrane shows reduced interfacial resistance, when it is assembled with electrodes, and it achieves excellent fuel cell performance.

In certain preferred embodiments of the invention, the polymer blend electrolyte membrane is a mixture solution comprising, based on 100 parts by weight of solids, 30-80 parts by weight of the polymer electrolyte preferably comprising, consisting essentially of or consisting of phosphoric acid linked to the inorganic polymer. If the content of the phosphoric acid-linked inorganic polymer is less than 30 parts by weight, the phosphoric acid-linked conducting channels can be reduced, leading to a decrease in the ion conductivity of the resulting membrane at high temperatures, and if the content is more than 80 parts by weight, the mechanical strength of the resulting membrane can be reduced.

According to certain embodiments, when the polymer electrolyte fuel cell is operated at a temperature higher than 100° C., the activity of the electrode catalyst and the reaction rate of the electrode can suitably increase, so that the fuel cell performance can be improved with a reduced amount of the catalyst, and a suitable decrease in the amount of use of an expensive platinum catalyst can lead to the effect of reducing the cost of the fuel cell system. Moreover, a few ppm of hydrocarbon contained in reformed hydrogen fuel is suitably oxidized to carbon monoxide by a catalytic reaction on the electrode surface, and the generated carbon monoxide is adsorbed onto the surface of the platinum catalyst to cause catalyst poisoning. The adsorption of carbon monoxide onto the catalyst is an exothermic reaction, and thus, in certain embodiments, when the fuel cell is preferably operated at high temperatures, catalyst poisoning can be relieved even in the use of reformed hydrogen gas containing a small amount of hydrocarbon, so that the performance of the fuel cell can be stably improved. In other embodiments, when the fuel cell can be operated without external pressurization, an external pressurizing device and a humidifying device become simple or unnecessary, thus providing significant advantages in terms of the optimization of the entire system and costs.

The inventive proton-conducting polymer membrane for use at high temperature, manufactured as described above, can be suitably applied to manufacture a membrane-electrode assembly for fuel cells and to manufacture a fuel cell comprising the membrane-electrode assembly.

The method as described herein for manufacturing the polymer blend electrolyte membrane has advantages in that the cost of the material is low due to the use of the inorganic polymer, and the manufacturing process is simple, thus the method as described herein can be used in processes of mass production and moreover is an economically conscious and cost effective process.

Hereinafter, the present invention will be described in further detail with reference to examples, but the scope of the present invention is not limited to these examples.

EXAMPLES

Example

Polymer Blend Electrolyte Membrane 3.16 g of Nafion 112, produced by Dupont, and 2.5 g of polydimethylsilane, were dissolved in 107 g of dimethylacetamide to prepare a solution of 5 wt % of Nafion/polydimethylsilane. 2.01 g of 3-aminopropyltriethoxysilane and 0.23 g of tetraethylorthosilicate were stirred at 80° C. for 5 hours, and then the stirred solution was added to the Nafion/polydimethylsilane solution and stirred at 80° C. for 5 hours. The stirred Nafion/polydimethylsilane/3-aminopropyltriethoxysilane/tetraethylorthosilicate solution was cast into a film, and then maintained in an oven at 100° C. for 12 hours to evaporate the solvent, thus manufacturing a proton-conducting polymer membrane.

The manufactured membrane was boiled in an acetonitrile solution, containing 0.2 mole % of phosphoroxychloride, for 2 hours. The boiled membrane was dried, and then immersed in deionized water for 24 hours to remove the Cl group, thus manufacturing a polymer blend electrolyte membrane of Nafion/polydimethylsilane/3-aminopropyltriethoxysilane/tetraethylorthosilicate/phosphoroxychloride.

Comparative Example

A commercial Nafion 112 proton-conducting polymer membrane (thickness: 50 μm), produced by Dupont, was treated in hydrogen peroxide at 100° C. for 3 hours to remove contaminants from the surface. Then, the treated resin was further treated with 1M sulfuric acid aqueous solution at 100° C. for 2 hours and was stored in deionized water.

Test Example 1

Measurement of Hydrogen Ion Conductivity

The ion conductivities of the Nafion/polydimethylsilane/3-aminopropyltriethoxysilane/tetraethylorthosilicate/phosphoroxychloride membrane and the Nafion 112, manufactured in the Example and the Comparative Example, respectively, were measured by a constant current four-probe method. Test samples, each having a size of 0.5 cm×2 cm, were prepared using the membranes, and a constant alternating current was applied to both ends of each of the samples, while alternating potential generated in the central portion of each of the samples was measured, thus obtaining the hydrogen ion conductivities of the samples. The measurement was carried out in the temperature range from room temperature to 130° C. The measurement results are shown in FIG. 2.

Figure 2:
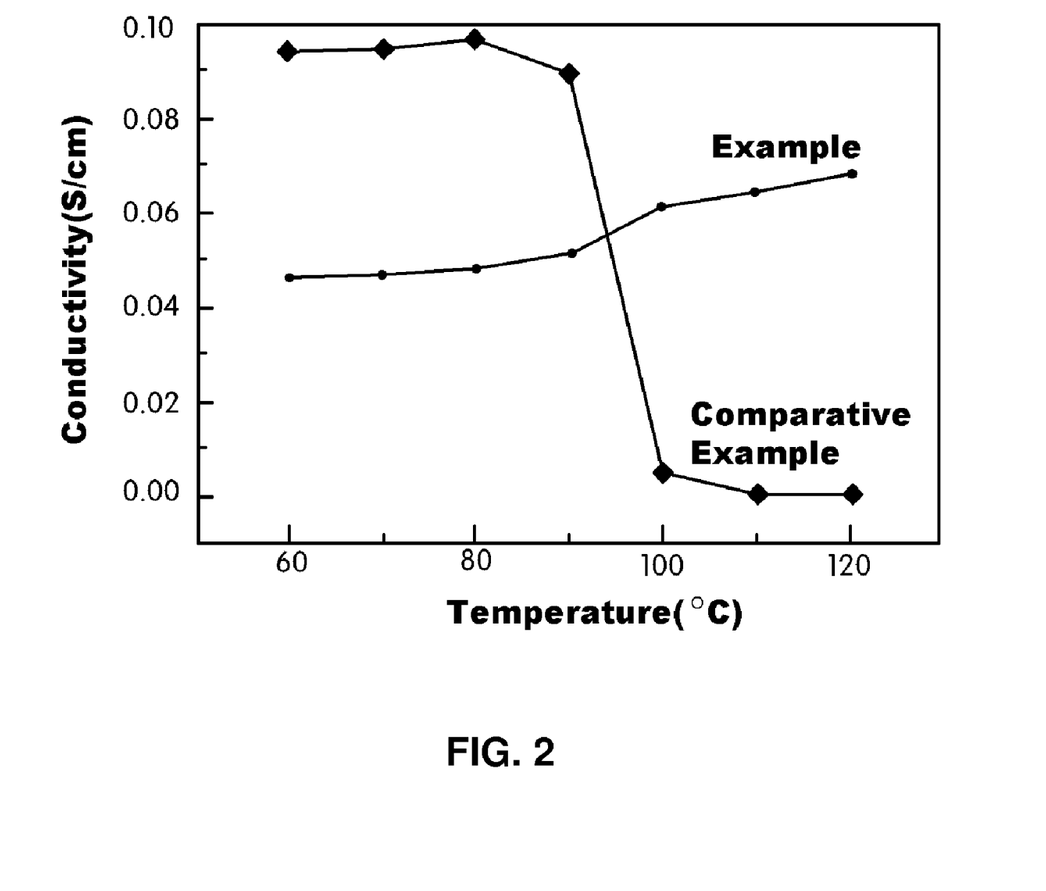
FIG. 2 is a graphic diagram showing the ionic conductivities of a polymer blend electrolyte membrane and a proton-conducting polymer membrane, manufactured in Example of the present invention and Comparative Example, respectively, as a function of temperature.

As can be seen in FIG. 2, the hydrogen ion conductivity of the sample, prepared in Comparative Example, showed a tendency to increase slightly with an increase in temperature at 100° C. or less, but it was reduced rapidly at 100° C. or more. This is because the conducting medium water was reduced rapidly due to the vaporization of water in the Nafion membrane at temperatures higher than the boiling point of water, because the hydrogen ions were transferred through a sulfate group and water. However, in the case of the test sample prepared in Example of the present invention, because the chemically linked phosphoric acid was used as a conducting medium, the phosphoric acid was not leached with water at temperatures lower than the boiling point of water. Also, the test sample of the Example showed constant hydrogen ion conductivity in a wide temperature range, because the conduction of hydrogen ions by the phosphoric acid was possible, even though water was not present at high temperatures. Thus, at temperatures higher than 100° C., the blended Nafion did not perform ionic conduction, but showed high ion conductivity due to the phosphoric acid channels which did not require water. As shown in FIG. 2, the test sample of the Example showed a rapid increase in ion conductivity at 100° C., and particularly, reached an ion conductivity of 0.07 S/cm at 120° C., suggesting that it showed very excellent ion conductivity.

Test Example 2

Measurement of Fuel Cell Performance

On both sides of the Nafion/polydimethylsilane/3-aminopropyltriethoxysilane/tetraethylorthosilicate/phosphoroxychloride membrane and the Nafion 112, manufactured in the Example and the Comparative Example, respectively, commercial catalyst electrode layers were coated using a silk screening method, thus manufacturing membrane-electrode assemblies (MEAs).

The used electrodes were single-sided ELAT electrodes commercially available from E-TEK Inc., and a platinum-carbon (Pt/C) catalyst was used on both the anode and the cathode. A silicone-coated glass fiber gasket was placed on both sides of each of the membrane-electrode assemblies and pressed and sealed with a current collector plate made of a carbon material, thus manufacturing unit fuel cells.

In unit fuel cell tests, the stoichiometric ratios of pure hydrogen and water, fed to the anode and cathode, were set to 1.2 and 2.0, respectively, and the test pressure was 30 psi. Also, the performance of each of the fuel cells was measured at 120° C., and humidity was set to 0%. The measurement results are shown in FIG. 3.

Figure 3:
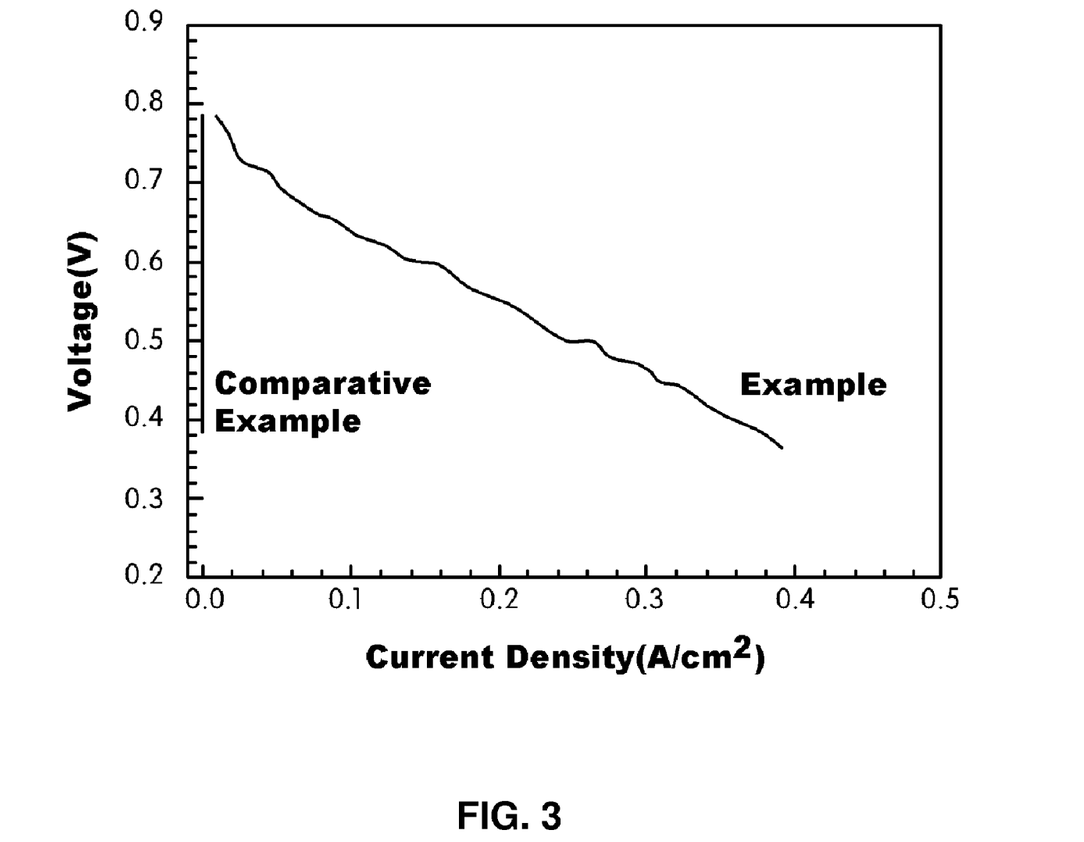
FIG. 3 is a graphic diagram showing current-voltage curves of a polymer blend electrolyte membrane and a proton-conducting polymer membrane, manufactured in Example of the present invention and Comparative Example, respectively, at 120° C. in non-humidified conditions.

As can be seen in FIG. 3, the fuel cell, comprising the polymer blend electrolyte membrane manufactured in the Example, showed a high current density. However, the fuel cell, comprising the Nafion 112 membrane manufactured in the Comparative Example, showed a low current density due to an increase in the resistance of Nafion 112 caused by the evaporation of water.

As described above, the present invention relates to a polymer blend electrolyte membrane and a manufacturing method thereof. More particularly, the present invention relates to the development of a polymer blend electrolyte membrane, which can conduct protons at room temperature and high temperatures, in which the membrane is manufactured by forming pore structures of 3-aminopropyltriethoxysilane and tetraethylorthosilicate, substituting both ends of polydimethylsilane with the pore structures to synthesize a precursor, and blending the polymer, having phosphoric acid substituted at the amino group thereof, with a polymer having a cation exchange group at the side chain thereof. In particular, due to the property of phosphoric acid, the inventive membrane can maintain excellent ion conductivity at high temperatures without needing external pressurization, and thus a fuel cell comprising the inventive membrane can be operated in conditions of high temperature and atmospheric pressure.

The electrolyte membrane, developed through the present invention, can be applied not only in residential fuel cells, but also in middle- and large-sized polymer electrolyte fuel cells for electrical vehicles, which must be operated at high temperatures.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polymer blend electrolyte membrane comprising
   an inorganic polymer having polydimethylsiloxane as a
      main chain, which has a pore structure at both ends formed by condensation reaction between 3-aminopropyltriethoxysilane and tetraethylorthosilicate, wherein phosphoric acid is chemically linked to an amino group of the pore structure; and a proton-conducting polymer having a cation exchange group at the side chain thereof.

2. The polymer blend electrolyte membrane of claim 1, wherein the proton-conducting polymer having a cation exchange group at the side chain thereof is selected from the group consisting of fluorine-based polymers, represented by the following formula I, sulfonated poly(ether ether ketone) (s-PEEK)) and polybenzimidazole (PBI):

[Formula I]

where m=1, x=5-13.5, n=2, y=1, and equivalent weight=1100-1200; or m=0, 1, n=1-5, and equivalent weight=1000; or m=0, n=2-5, x=1.5-14, and equivalent weight=1000-1200.

3. The polymer blend electrolyte membrane of claim 1, wherein the polymer having phosphoric acid chemically linked thereto is contained in an amount of 30-80 parts by weight based on 100 parts by weight of the polymer blend electrolyte membrane.

4. A method for manufacturing a proton-conducting polymer blend electrolyte membrane, the method comprising the steps of:

blending a polymer consisting of an inorganic polymer, which has polydimethylsiloxane as a main chain and comprises pore structures of 3-aminopropyltriethoxysilane and tetraethylorthosilicate at both ends thereof, with a proton-conducting polymer having a cation exchange group at the side chain thereof; and adding phosphoroxychloride to the polymer blend to link phosphoric acid to the amino group of the polymer blend so as to impart ionic conductivity to the polymer blend.

5. The method of claim 4, wherein the polymer having phosphoric acid chemically linked thereto is contained in an amount of 30-80 parts by weight based on 100 parts by weight of the polymer blend electrolyte membrane.

6. The method of claim 4, wherein the proton-conducting polymer having a cation exchange group at the side chain thereof is selected from the group consisting of fluorine-based polymers represented by the following formula I, sulfonated poly(ether ether ketone) (s-PEEK)) and polybenzimidazole (PBI):

[Formula 1]

where m=1, x=5-13.5, n=2, y=1, and equivalent weight=1100-1200; or m=0, n=1-5, and equivalent weight=1000; or m=0, n=2-5, x=1.5-14, and equivalent weight=1000-1200.

7. The method of claim 4, wherein the step of blending the polymers is carried out in an organic solvent, which is one or a mixture of two or more selected from among N—methyl-2-pyrrolidinone (NMP), dimethylformamide (DMF), dimethyl acetamide (DMA), tetrahydrofuran (THF), dimethyl sulfoxide (DMSO), acetone, methyl ethyl ketone (MEK), tetramethylurea, trimethyl phosphate, butyrolactone, isophorone, carbitol acetate, methyl isobutyl ketone, N-butyl acetate, cyclohexanone, diacetone alcohol, diisobutyl ketone, ethyl acetoacetate, glycol ether, propylene carbonate, ethylene carbonate, dimethylcarbonate and diethylcarbonate.

* * * * *